(12) United States Patent
Kahn

(10) Patent No.: US 11,036,471 B2
(45) Date of Patent: Jun. 15, 2021

(54) DATA GROUPING FOR EFFICIENT PARALLEL PROCESSING

(71) Applicant: SAP SE, Walldorf (DE)

(72) Inventor: Markus Kahn, Kell am See (DE)

(73) Assignee: SAP SE, Walldorf (DE)

(*) Notice: Subject to any disclaimer, the term of this patent is extended or adjusted under 35 U.S.C. 154(b) by 254 days.

(21) Appl. No.: 16/001,165

(22) Filed: Jun. 6, 2018

(65) Prior Publication Data

US 2019/0377547 A1 Dec. 12, 2019

(51) Int. Cl.
*G06F 7/08* (2006.01)
*G06F 16/22* (2019.01)

(52) U.S. Cl.
CPC ............ *G06F 7/08* (2013.01); *G06F 16/2255* (2019.01)

(58) Field of Classification Search
CPC ...... G06F 7/08; G06F 16/2255; G06F 16/285; G06F 16/24578; G06F 16/93
USPC ........................................................ 707/737
See application file for complete search history.

(56) References Cited

U.S. PATENT DOCUMENTS

| | | | |
|---|---|---|---|
| 7,596,520 B2 | 9/2009 | Kahn et al. | |
| 8,095,442 B2 | 1/2012 | Baumann et al. | |
| 8,200,557 B2 | 6/2012 | Kahn et al. | |
| 8,275,775 B2 | 9/2012 | Jung et al. | |
| 8,311,918 B2 | 11/2012 | Baumann et al. | |
| 8,438,190 B2 | 5/2013 | Jung et al. | |
| 8,498,917 B2 | 7/2013 | Kahn et al. | |
| 8,671,041 B2 | 3/2014 | Haaf et al. | |
| 9,043,236 B2 | 5/2015 | Kahn et al. | |
| 9,076,112 B2 | 7/2015 | Kahn et al. | |
| 9,292,523 B1* | 3/2016 | Todd | G06F 16/13 |
| 2006/0069632 A1 | 3/2006 | Kahn et al. | |
| 2006/0280302 A1 | 12/2006 | Baumann et al. | |
| 2006/0282360 A1 | 12/2006 | Kahn et al. | |
| 2009/0313157 A1 | 12/2009 | Kahn et al. | |
| 2001/0153297 | 6/2010 | Haaf et al. | |
| 2010/0192148 A1* | 7/2010 | Chen | G06F 16/278 718/1 |
| 2011/0173203 A1 | 7/2011 | Jung et al. | |
| 2011/0173220 A1 | 7/2011 | Jung et al. | |
| 2011/0276789 A1* | 11/2011 | Chambers | G06F 9/445 712/220 |
| 2012/0110034 A1 | 5/2012 | Baumann et al. | |
| 2012/0227000 A1 | 5/2012 | Haaf et al. | |
| 2013/0151464 A1* | 6/2013 | Hermann | G06F 16/2465 707/600 |

(Continued)

*Primary Examiner* — Hosain T Alam
*Assistant Examiner* — Nicholas E Allen
(74) *Attorney, Agent, or Firm* — Klarquist Sparkman, LLP

(57) ABSTRACT

An improved process for distributing data objects and a process for reducing skew in groups of data objects to be processed in parallel are provided herein. A request for parallel processing of a plurality of data objects is received. One or more groups for distributing the data objects are generated. Hash value intervals for the one or more groups are determined. Hash values for the plurality of data objects are determined. The plurality of data objects are distributed into the one or more groups based on their respective hash values and the hash value intervals. The plurality of data objects are processed in parallel by the groups comprising the distributed data objects. The processing results of the plurality of data objects are provided in response to the request.

20 Claims, 14 Drawing Sheets

(56) References Cited

U.S. PATENT DOCUMENTS

| | | | | |
|---|---|---|---|---|
| 2013/0173560 A1* | 7/2013 | McNeill | | G06F 16/215 707/692 |
| 2013/0233091 A1 | 9/2013 | Tetsuka | | |
| 2013/0290168 A1 | 10/2013 | Kahn et al. | | |
| 2014/0058905 A1 | 2/2014 | Kahn et al. | | |
| 2014/0058906 A1 | 2/2014 | Kahn et al. | | |
| 2014/0058907 A1 | 2/2014 | Kahn et al. | | |
| 2014/0058911 A1 | 2/2014 | Kahn et al. | | |
| 2014/0122484 A1* | 5/2014 | Jagtiani | | G06F 16/2282 707/737 |
| 2014/0143178 A1 | 5/2014 | Haaf et al. | | |
| 2015/0019511 A1* | 1/2015 | Aronovich | | G06F 3/0608 707/692 |
| 2015/0095277 A1* | 4/2015 | Tristan | | G06N 7/005 706/52 |
| 2015/0106345 A1* | 4/2015 | Trimble | | G06F 16/1748 707/692 |
| 2015/0142808 A1* | 5/2015 | Ren | | G06K 9/6223 707/737 |
| 2015/0248451 A1* | 9/2015 | Walker | | H04L 67/06 707/753 |
| 2015/0254288 A1* | 9/2015 | Garth | | G06F 9/5005 707/753 |
| 2015/0278937 A1 | 10/2015 | Kahn et al. | | |
| 2015/0309999 A1* | 10/2015 | Ng | | G06F 16/285 707/809 |
| 2015/0379076 A1* | 12/2015 | Grosse | | G06F 16/24542 707/718 |
| 2016/0034527 A1* | 2/2016 | Barber | | G06F 16/24554 707/693 |
| 2016/0070721 A1* | 3/2016 | Menendez | | G06F 16/1858 707/823 |
| 2016/0098453 A1* | 4/2016 | Gaza | | G06F 16/24554 707/718 |
| 2016/0171072 A1* | 6/2016 | Jagtiani | | G06F 16/273 707/769 |
| 2016/0210340 A1* | 7/2016 | Cai | | G06F 16/27 |
| 2017/0031988 A1* | 2/2017 | Sun | | G06F 16/24554 |
| 2018/0025007 A1* | 1/2018 | Dai | | G06F 16/2455 707/770 |

\* cited by examiner

FIG. 5

DATA GROUPING FOR EFFICIENT PARALLEL PROCESSING

FIELD

The present disclosure generally relates to database management systems, and applications or systems that perform data object analysis or processing. Particular implementations relate to evenly distributing records or data objects in preparation for parallel processing.

BACKGROUND

Large databases storing massive amounts of data are increasingly common. Such massive amounts of data are often processed in parallel, but poor system performance and inefficient memory usage are common in parallel mass data processing if the data are not properly distributed to the parallel processes. In such cases, data clusters that cause memory leaks and poor system performance may be common, which is disruptive to system performance. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A process for improved data distribution for parallel processing is provided herein. A plurality of data objects is received. A total number of data objects (in the plurality of data objects) is calculated. A total number of groups into which to distribute the data objects, based at least in part on the total number of data objects, is determined.

Group hash values are calculated in parallel for the respective groups. The group hash values are sorted. The group hash values are assigned to the groups in sorted order. Hash value intervals for the respective groups are determined, based in part on their respective hash values and the hash value of the group immediately preceding.

Data object hash values are calculated in parallel for the respective data objects in the plurality of data objects. The plurality of data objects are distributed in parallel to the groups based on their respective data object hash values and the hash value intervals. The groups comprising the distributed plurality of data objects for processing the data objects in parallel by group are provided.

An improved process for distributing data objects is provided herein. A request for parallel processing of a plurality of data objects is received. One or more groups for distributing the data objects are generated. Hash value intervals for the one or more groups are determined. Hash values for the plurality of data objects are determined. The plurality of data objects are distributed into the one or more groups based on their respective hash values and the hash value intervals. The plurality of data objects are processed in parallel by the groups comprising the distributed data objects. The processing results of the plurality of data objects are provided in response to the request.

A process for reducing skew in groups of data objects to be processed in parallel is provided herein. A plurality of data objects may be received. A total number of groups for distributing the data objects may be determined. Value intervals for the groups may be generated using a discretized value generation function. A value generated using the discretized value generation function may be assigned to a given data object of the plurality of data objects. The given data object may be distributed into a given group of the groups based on the value assigned to the given data object and the generated value interval for the given group. The groups having the distributed data objects may be provided.

The present disclosure also includes computing systems and tangible, non-transitory computer readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

BRIEF DESCRIPTION OF THE DRAWINGS

FIG. 5 is an example report for evenly distributed data object groups.

DETAILED DESCRIPTION

Figure 1A:
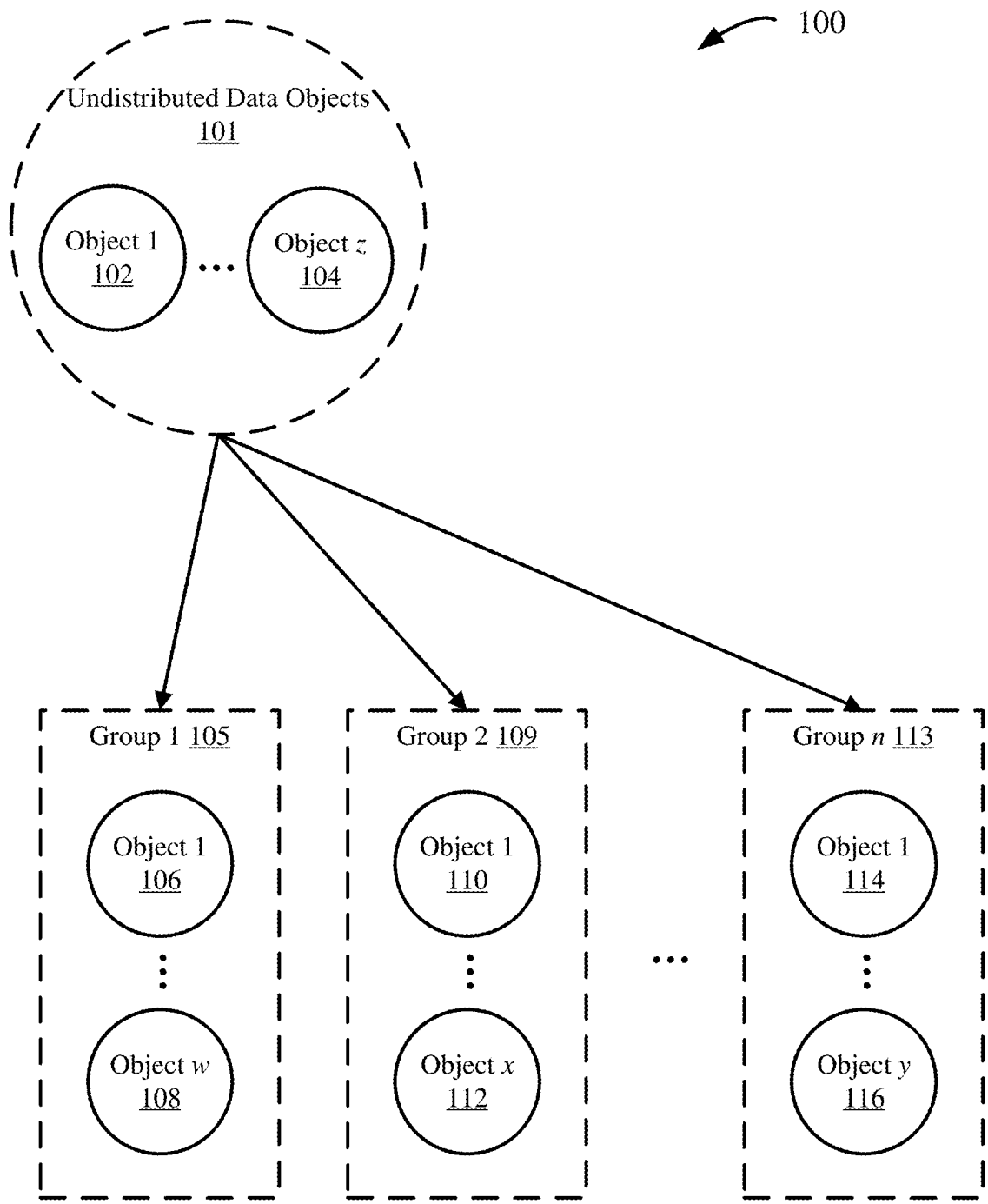
FIG. 1A is a schematic diagram of data object groupings.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Data Distribution Overview

A process for efficient grouping of unequally distributed data for parallel processing is provided herein. Data grouping or partitioning may be used to improve the efficiency of data processing. Data grouping or partitioning may often be fixed, dependent upon the data model used, or the criteria or attributes of the data objects being grouped. A challenge is to create data groups from huge data sets, which may contain billions of data objects or records, where the data groups may contain non-overlapping data objects and where the group sizes of all groups are approximately even with regard to the number of data objects or records within a given group. Further, it is typically desirable that the data groups should be created independently of the data model, interrelationships, or attributes of the data objects or records, thus avoiding changes to existing data structures. Such a process may improve system runtime performance and efficient memory usage without requiring major changes to existing data models or structures, or adding complexity or inefficient trade-offs to new data model or structure development.

As an example, data may be partitioned or sorted in a database system based on a primary use case. For example, the data may be ordered by a row ID or primary key value. However, this arrangement may lead to skew problems when processed or accessed for other purposes. While the data could be rearranged for the new or alternative use, this would be both resource intensive and time consuming, and would likely result in reduced performance for other, perhaps more important, processes. The disclosed processes allow for comparatively even data distributions to be created on the fly, thus conserving resources and maintaining performance of other database processes. Further, the disclosed processes are broadly compatible with most or all database systems or computing systems, and generally do not depend on specific features, implementations, or data models to effectively and efficiently group data objects.

Rather than use data attributes or other existing criteria, hash values may be calculated for individual data objects. Such hash values may be based on non-partitioning criteria (e.g. the problematic clustering criteria), a data object identifier or name (e.g. primary key), other data object attributes, or other arbitrary inputs or criteria unrelated to the data object (e.g. randomized input). Generally, a hash function used in this process should exhibit the property of uniformity (that all output hash values have the same probability to be generated), thus resulting in random, but approximately even, distribution of hash values for the data objects. These hash values can be compared against hash intervals (that may even be pre-calculated) that are individually determined for each group or package. Thus, this allows the distribution of data objects across the groups efficiently at runtime before or during the parallel phase of processing the data objects.

Such a solution can avoid the necessity of making changes to the data model to allow for even distribution of the data objects for parallel processing, as it is independent of the data objects, their interrelationships, or their attributes. Changes to a data model can be highly problematic in customer systems, and in most cases they are technically not feasible. Data model changes or customization may be carried out once in a first delivery (e.g., initial deployment or installation) of the software, but later on this is often no longer acceptable. In addition, changes to a database model often will work for a few real use cases only but not to all (as the future is not foreseeable). Such problems and expense can be avoided using the disclosed technologies, which can allow systems to build data-model independent, evenly distributed data groups or packages for arbitrary use cases.

Example 2—Data Object Groups

FIG. 1A is a schematic diagram 100 of data object groupings. A multitude of undistributed data objects 101 may include one or more specific data objects, such as Object 1 102 through Object z 104. A data object, such as Objects 1-z 102,104 in the undistributed data objects 101, may be records in a database, instantiated class objects, data variables, data files, records in data files, nodes in a tree or other hierarchy, or other programmatic objects that contain information (e.g., data objects in a database, such as tables or views, or other database objects such as procedures, synonyms, sequences, or triggers). Such objects may also be metadata objects having metadata regarding the object or the dependencies of the object.

The undistributed data objects 101 may be a broad plurality of data objects, such as all records in a database, or may be a specific set or collection of data objects, such as the records that form the results set from a database query.

The undistributed data objects 101 may be distributed to one or more groups of data objects, such as Group 1 105, Group 2 109, through Group n 113. Generally, each of the undistributed data objects 101 may be distributed to a single group of Groups 1-n 105, 109, 113. Thus, if Object 1 102 is put into Group 1 105, it generally will not also be put in any other group of Groups 2-n 109, 113. However, in some cases, objects 101 can be duplicated and distributed into different groups, such as to increase join efficiency or provide local access to commonly used data objects or values. For example, a reference object used in processing the other data objects may be distributed to each group, thereby avoiding each group making an external call to access the reference object. In some aspects, such a reference object can be considered to an object to be added to each group 105, 109, 113, rather than an undistributed data object 101. In addition, although a single object 101 is typically distributed to a single group, in at least some cases, the data objects 101 can include duplicate items, where items having the same value may be distributed to different groups. For example, two data objects may have the same values while being separate data objects.

Each group 105, 109, 113 may have one or more data objects distributed to it from the undistributed data objects 101. For example, Group 1 105 may have data objects Object 1 106 through Object w 108; Group 2 109 may have data objects Object 1 110 through Object x 112; Group n 113 may have data objects Object 1 114 through Object y 116. Generally, each group 1-n 105, 109, 113 is a subset of the undistributed data objects 101, and thus the total number of data objects in the groups 1-n 105, 109, 113 will be less than or equal to the total number of data objects in the undistributed data objects 101. However, as discussed above, in some cases undistributed data objects 101 can be duplicated, and thus the total number of data objects in the groups can exceed the number of distributed data objects.

Each group 1-n 105, 109, 113 may have a number of data objects. The number of data objects in each group 105, 109, 113 may vary depending on the criteria, attribute, or method used to distribute the data objects. With many known methods, the distribution of data objects is generally prone to being uneven, or skewed, between the different groups 1-n 105, 109, 113. For example, data object distribution may use a single variable, criteria, or attribute of the data objects (e.g., where the data objects are rows in a database, distribution may be carried out based on the value of a given column), which may result in Group 1 105 having 1,000 data objects, Group 2 109 having 1,100 data objects, and Group n 113 having 90,000 data objects. This may often be an inefficient outcome for processing the varying groups 1-n 105, 109, 113. Thus, the data objects may instead be distributed approximately evenly using the methods as disclosed herein.

A group, such as groups 1-n 105, 109, 113, may be implemented as a collection of references to the data objects. For example, a group may be an array of pointers (logical or physical) to the data objects in the group, or a string variable of delimited pointers, or another variable or set of variables that stores references to the data objects. A group may alternatively be defined or stored as a search or selection query, or may be the returned results of the query, such as the row results of a database query. In another embodiment, a group may be a collection of the data objects themselves, linked together such as in a linked list or other implementation (including other types of data structures) compatible with the data objects themselves.

In some cases, the undistributed data objects 101 may be stored data objects, and be replicated or redistributed into the groups 105, 109, 113 (which may be by distributing references or pointers to the stored data objects). In other cases, the data objects are distributed to the groups 105, 109, 113 when the data objects are created, and the data objects need not be stored, including being separately stored.

Example 3—Multilevel Data Object Groups

Figure 1B:
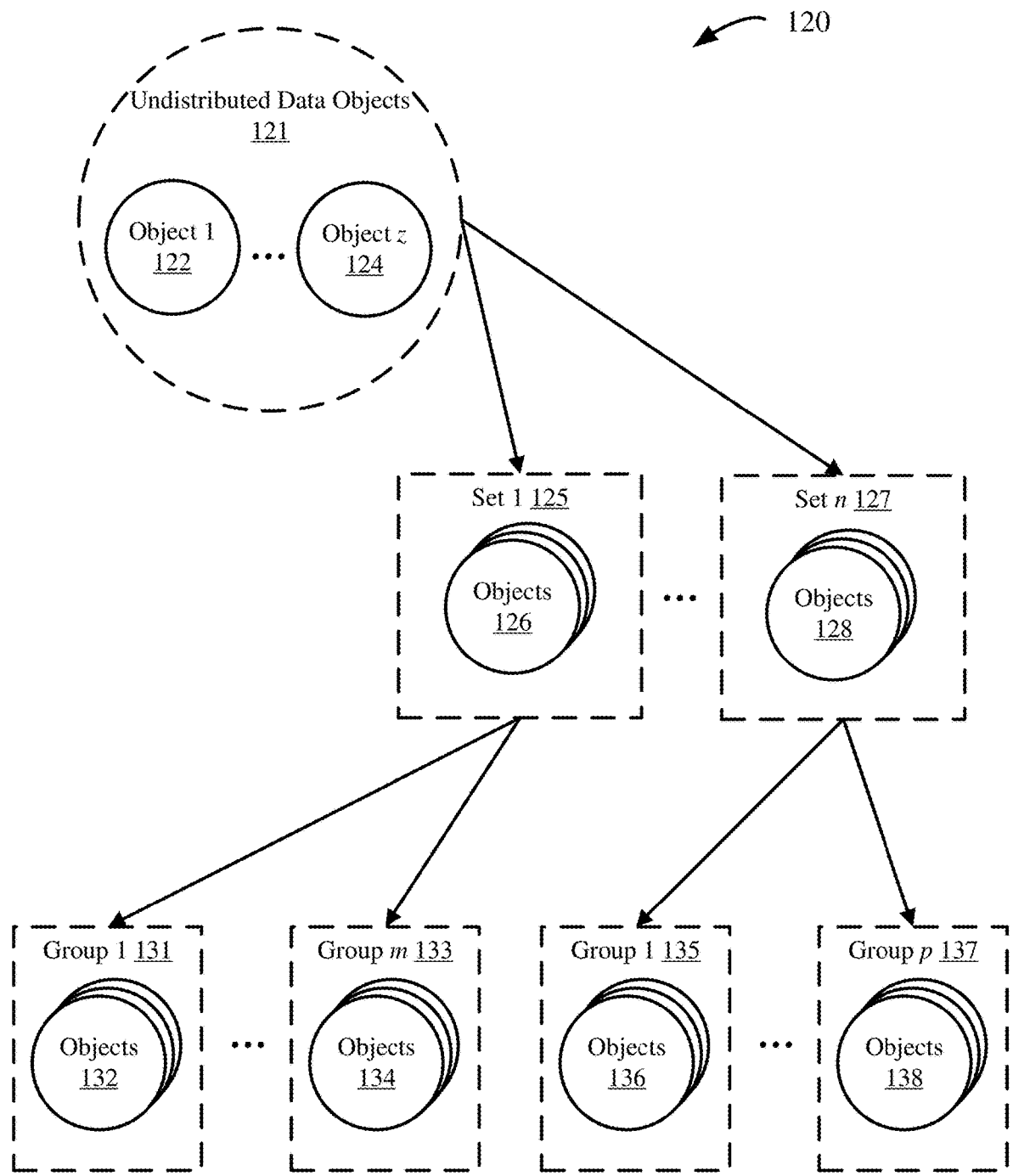
FIG. 1B is a schematic diagram of multilevel data object groupings.

FIG. 1B is a schematic diagram 120 of multilevel data object groupings. A multitude of undistributed data objects 121 may include one or more specific data objects, such as Object 1 122 through Object z 124. A data object, such as Objects 1-z 122,124 in the undistributed data objects 121, may be records in a database, instantiated class objects, data variables, data files, records in data files, nodes in a tree or other hierarchy, or other programmatic objects that contain information (e.g., data objects in a database, such as tables or views, or other database objects such as procedures, synonyms, sequences, or triggers). Such objects may also be metadata objects having metadata regarding the object or the dependencies of the object.

The undistributed data objects 121 may be a broad plurality of data objects, such as all records in a database, or may be a specific set or collection of data objects, such as the records that form the results set from a database query.

The undistributed data objects 121 may be distributed to one or more sets of data objects, such as Set 1 125 through Set n 127. Generally, each of the undistributed data objects 121 may be distributed to a single set of Sets 1-n 125, 127. Thus, if Object 1 122 is put into Set 1 125, it generally will not also be put in any other set of Set 2-n 127. However, as described above, in some cases objects may be duplicated in an original data set, or may be duplicated or replicated during the distributing, so as to improve processing efficiency, for example. The sets 125, 127 may be formed from separate queries or selections from the undistributed data objects 121, or may be particular collections or partitions of data objects from a single query or selection. Criteria or attributes may be used to determine the sets 125, 127; the same criteria or attributes may be used to determine all the sets or different criteria or attributes may be used to determine some of the sets, or each separate set individually. The sets 125, 127 may vary in size between each other, and so data objects from the undistributed data objects 121 may not be distributed evenly between the sets. In some embodiments, distribution into the sets 125, 127 may be accomplished based on the methods as described herein, and thus may be distributed approximately evenly. In a particular examples, the sets 125, 127 can correspond to the groups 105, 109, 113 of FIG. 1A.

The separate sets 1-n 125, 127 may be distributed individually to one or more groups of data objects. For example, Set 1 125 may be distributed to Group 1 131 through Group m 133, while Set n 127 may be distributed to Group 1 135 through Group p 137. Each group may have one or more data objects from its corresponding set: Group 1 131 may have one or more data objects 132 from Set 1 125 and Group m 133 may have one or more data objects 134 from Set 1 125, which are different data objects than those in Set 1's Group 1, while Group 1 135 may have one or more data objects 136 from Set n 127 and Group p 137 may have one or more data objects 138 from Set n 127, which are different data objects than those in Set n's Group 1. Generally, each of the data objects 126, 128 in a given set 125, 127 may be distributed to a single group of Groups 1-m 131, 133 or Groups 1-p 135, 137. Generally, the groups 131, 133, 135, 137 may act as subdivisions or subsets of their respective sets 125, 127. Thus the total number of data objects in a collection of groups 131, 133, 135, 137 will typically be less than or equal to the total number of data objects in their respective sets 125, 127.

Data objects 126, 128 from two different sets 125, 127 are not generally distributed into the same group. Thus, each set 125, 127 is handled independently of the other sets.

Each group 131, 133, 135, 137 may have one or more data objects distributed to it from the sets 125, 127 (or undistributed data objects 121 as discussed previously). Each group 1-m 131, 133 or 1-p 135, 137 may have a number of data objects 132, 134, 136, 138. Generally, each group 1-m 131, 133 or 1-p 135, 137 is a subset of its respective set 1-n 125, 127, and thus the total number of data objects in the groups 1-m 131, 133 or 1-p 135, 137 will be less than or equal to the total number of data objects in the respective set 1-n 125, 127. The number of data objects in each group may vary depending on the criteria, attributes, or method used to distribute the data objects. The data objects may be distributed approximately evenly using the methods as disclosed herein. However, in some cases, data objects 121 can be duplicated and included in multiple sets 125, 127 or groups 131, 133, 135, 137.

A group, such as groups 1-m 131, 133 or groups 1-p 135, 137, may be implemented as a collection of references to the data objects. For example, a group may be an array of pointers (logical or physical) to the data objects in the group, or a string variable of delimited pointers, or another variable or set of variables that stores references to the data objects. A group may alternatively be defined or stored as a search or selection query, or may be the returned results of the query, such as the row results of a database query. In another embodiment, a group may be a collection of the data objects themselves, linked together such as in a linked list or other implementation (including other data structures) compatible with the data objects themselves.

Example 4—Multilevel Data Object Groups by Criteria

Figure 1C:
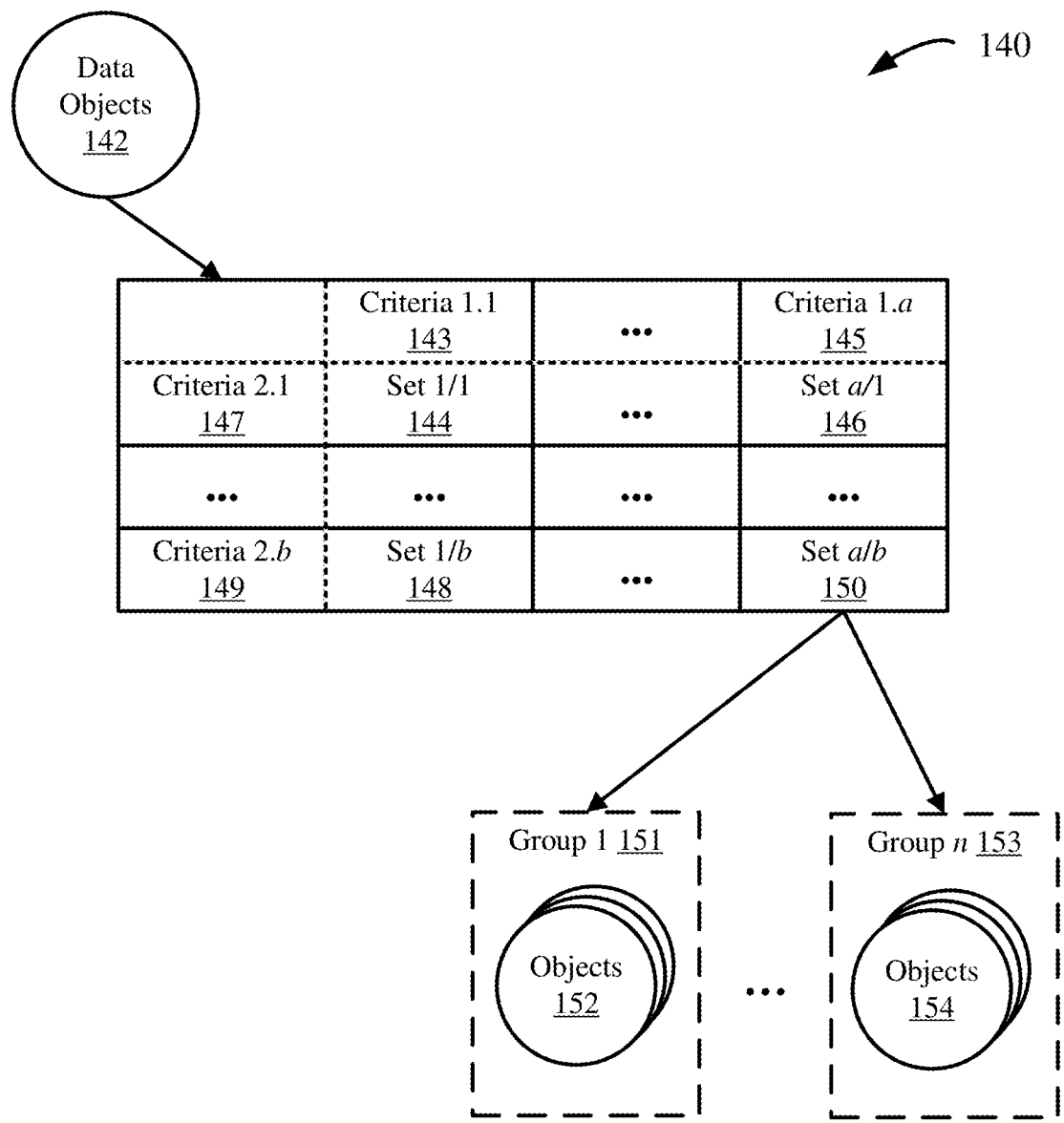
FIG. 1C is a schematic diagram of multilevel data object groupings by criteria.

FIG. 1C is a schematic diagram 140 of multilevel data object groupings partitioned by criteria. Data objects 142 may be partitioned into multiple sets based on criteria, attributes, or other variables, related to the data objects. The data objects 142 may be similar to the undistributed data objects 101, 121 in FIGS. 1A-B.

For example, the data objects 142 may be divided into multiple sets 144, 146, 148, 150 based on two criteria, such as criteria 1 and criteria 2 in the diagram 140. The criteria may be data variable or attributes related to the data objects; for example, if the data objects 142 are rows in a database, the criteria may each be a separate column (each column having one or more values). Criteria 1 may have multiple values, resulting in Criteria 1.1 143 through Criteria 1.a 145. Similarly, Criteria 2 may have multiple values, resulting in Criteria 2.1 147 through Criteria 2.b 149. The combinations of possible values of criteria 1 and 2 may be used to partition the data into data sets 144, 146, 148, 150. Thus, Criteria 1.1 143 through Criteria 1.a 145 and Criteria 2.1 147 may define Set 1/1 144 through Set a/1 146. Further, Criteria 1.1 143 through Criteria 1.a 145 and Criteria 2.b 149 may define Set 1/b 148 through Set a/b 150. Read by the columns, Criteria 1.1 143 and Criteria 2.1 147 through 2.b 149 may define Set 1/1 144 through Set 1/b 148, and Criteria 1.a 145 and Criteria 2.1 147 through 2.b 149 may define Set a/1 146 through Set a/b 150. More criteria or fewer criteria may be used to partition the data, with the data sets being formed accordingly based on the number of criteria and values of the criteria.

Thus, the data objects 142 may be divided (or distributed) into sets. Because the sets 144, 146, 148, 150 are based on the value of the criteria selected, the data sets may have varying sizes, or numbers of data objects within each set.

The data sets 144, 146, 148, 150 may be further divided into their own respective collection of groups. For example, Set a/b 150 may be divided into Group 1 151 through Group n 153. Although only groups for Set a/b 150 are shown, each of the sets 144, 146, 148, 150 may be divided into their own respective groups. Dividing the data sets into groups may include distributing the data objects in the set into the groups, as disclosed herein. Each group may have one or more data objects; for example, Group 1 151 may have objects 152 while Group n 153 may have objects 154. The objects in a set, such as Set a/b 150, may be distributed as disclosed herein.

Thus, data objects may be divided or partitioned based on their own attributes or other criteria, which may not result in even distribution, and also distributed into groups evenly, independently of their data or other factors. This multi-level distribution structure allows for an ultimately even distribution (by set) while still allowing divisions by potentially relevant criteria that may not result in even distributions.

In some cases, a set 144, 146, 148, 150 can have a single group, while in other cases a set can have multiple groups. In some cases, a set may not have any objects. If a set has objects, the objects are typically relatively evenly distributed in the groups, such as according to the disclosed techniques.

Example 5—Data Object Distribution

Figure 2:
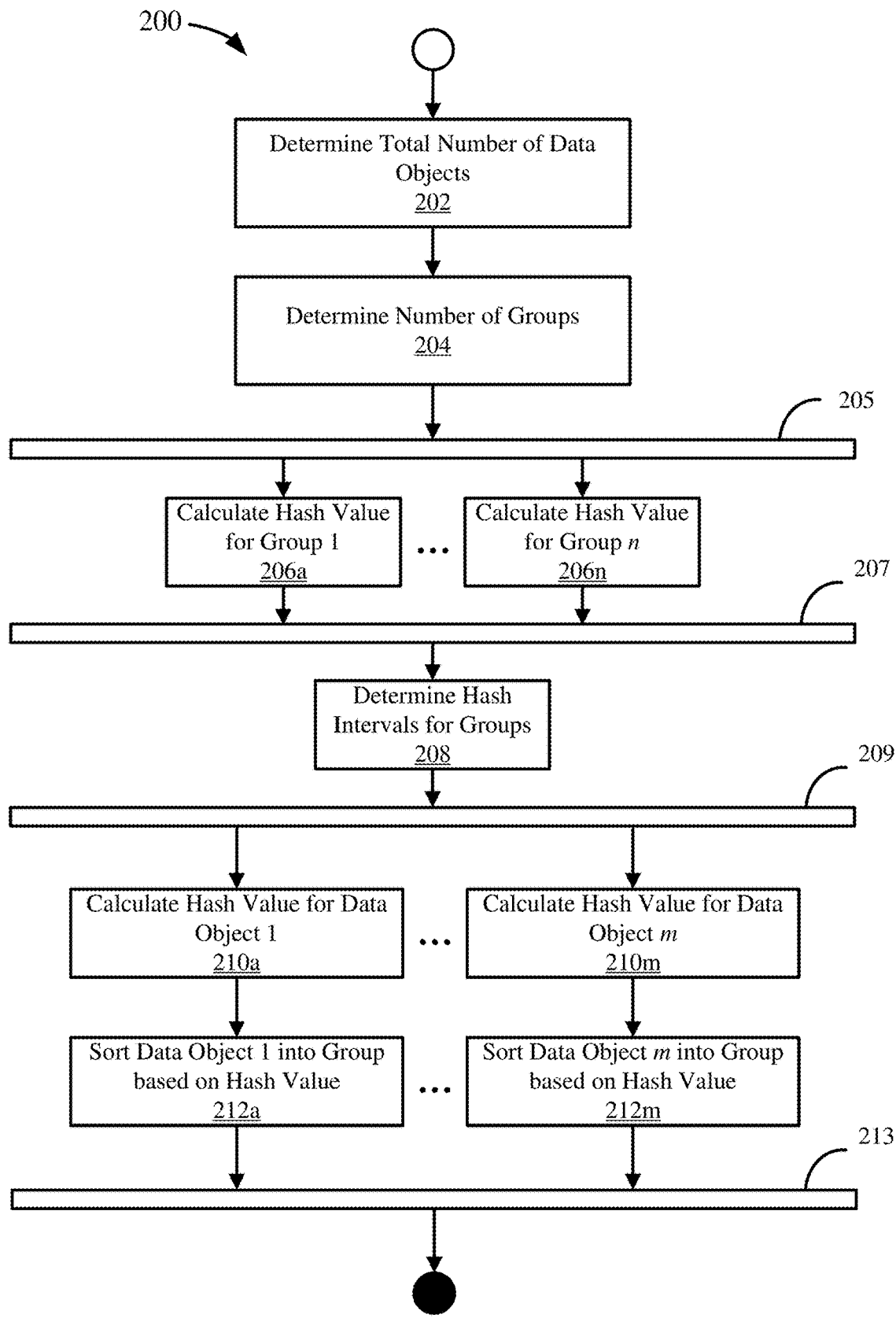
FIG. 2 is a flowchart illustrating a process for evenly distributing data objects into groups.

FIG. 2 is a flowchart illustrating a process 200 for evenly distributing data objects into groups. The total number of data objects is determined at 202. Generally, this is the total number of data objects that will be distributed into data groups, and may be undistributed data objects, such as in FIGS. 1A-B, or may be a set of one or more data objects, such as in FIGS. 1B-C.

The number of groups into which the data objects may be distributed is determined at 204. The number of groups may be a semi-static number, such as a constant value, a registry setting, or other variable that is used without calculation at step 204. Alternatively, the number of groups may be calculated based on the total number of data objects, such as when a target number of data objects is desired in each group. In another embodiment, the number of groups may be calculated based on the available computing resources available. For example, the number of groups may correspond to the number of CPUs, computing cores, or remote compute servers or other resources available, the number of threads available, the memory available for each computing resource so as to efficiently store each group of data objects while avoiding paging, or other factor or factors in determining efficient resource usage for processing the groups of data objects. In some cases, a user, or a rule, can specify an amount of computing resources that should be made available for grouping or subsequent parallel processing. Once the number of groups is determined, the process may have, or be considered to have, groups 1-n (the total number of groups). In some embodiments, the groups themselves are not yet generated, only the group number or identifier is known at 204.

Further, in some embodiments, processing of the groups may be staged at 204, once the total number of groups is determined. Staging may include defining or instantiating any necessary variables or data structures for containing or otherwise storing the data objects or references to the data objects in the groups.

A hash value is calculated for groups 1-n at 206a-n in parallel 205. A single hash value may be calculated for each group in parallel to the hash value calculation of each other group. The hash values may be calculated for specific groups, or a total number of hash values may be calculated equal to the total number of groups but not directly assigned or attributed to a group.

For example, a sample of hash values may be calculated independently of the groups. Such a sample of hash values may have sufficient hash values to form the hash value intervals for the determined number of groups. The sample of hash values may be used to build the interval boundaries for the groups. Hash values may be extracted from the sample of hash values to form the group intervals; generally, this may be done based on each group covering ranges of hash values that are at least approximately the same. Such scenarios are a statistical approach, and thus generally a larger sample set provides better range results. The interval boundaries are typically selected from the sample such that all possible hash values generated from data objects can be associated with a group (e.g., a data object would not be assigned a hash value for which there is no corresponding group).

In other scenarios, a non-statistical approach may be used to obtain the sample of hash values. Such scenarios may include using hexadecimal interval scale arithmetic to generate a list of available hash values (e.g., the sample of hash values).

A hash function may be used to calculate the hash values, such as MD5, Fowler-Noll-Vo, Jenkins, Pearson, Zobrist, SHA-1, or other hash functions. In one embodiment, the hash function may generate a text string of 32 characters in length, with a minimum value of "00000000000000000000000000000000" and a maximum value of "FFFFFFFFFFFFFFFFFFFFFFFFFFFFFFFF" (such a string may be a hexadecimal value, or function as a hexadecimal value). In some embodiments, a group number or name may be used as the input to the hash function, or a randomized or semi-randomized input may be used. In other embodiments, the hash values may be obtained from a hash table. The hash function generally should exhibit good uniformity, to reduce the likelihood of collisions and also to increase the chance of an even distribution of the hash values. Evenly distributed hash values are calculated at 206*a-n*, meaning that the hash values are approximately the same distance apart by value or increment range, increases the evenness of distribution of data objects later. The parallelization 205 may be closed at 207 once all the hash values are calculated for each group at 206*a-n*.

In other embodiments, another type of transformation or value generation technique may be used instead of a hash function, such as a discretized value generation function. Generally, such a transformation or value generation may generate at least approximately evenly distributed output values based on unstructured data, multidimensional data, one or more complex data arguments, one or more simple data arguments, or no input values. In such embodiments, the same transformation or value generation should generally be used throughout the process described herein.

The hash intervals are determined at 208, where a hash interval defines what object hash values will fall within a particular group. The hash intervals may be determined based on the hash values for the groups 1-n calculated at 206*a*-206*n*. The hash values may be sorted, in ascending order (or, in some cases, in descending order), either lexicographically or numerically (if the hash value is a number), in one embodiment. The hash values may then be assigned, or re-assigned, to each group in order, such that the lowest (or first) hash value is assigned the first group, and so on. Alternatively, the groups may be sorted along with the hash values, and so be "out of order."

The hash intervals are then the range of hash values between the hash values assigned to the groups. For example, the hash interval for the first group may be the range of hash values from the minimum hash value possible (inclusive) up to the hash value for that group (e.g., maximum hash value for that group). The hash interval for the second group may be the range of hash values from the hash value of the first group, exclusive, (e.g., maximum hash value for that group) up to the hash value of the second group, inclusive, (e.g., maximum hash value for that group) and so on for the remainder of the groups. For the last group, the maximum value for the hash interval may be the maximum possible hash value (which, in some cases, may be an extra group).

In some embodiments, the parallelization is not closed at 207 and the hash intervals are determined for each group in parallel at 208. Or, the parallelization is closed at 207 and a new parallelization can be initiated for 208.

Hash values are calculated for each data object 1-m at 210*a-m* in parallel 209. The hash values for the data object may be calculated similarly as described for calculating the hash values for the groups at 206*a-n*. Generally, the hash function used for calculating the hash values for the data objects at 210*a-m* should be the same hash function as used for the groups at 206*a-n*, thus allowing the hash values to be comparable.

As the hash values are calculated for the data objects 1-m 210*a-m* in parallel 209, the data objects are then sorted or placed into their respective groups based on their calculated hash value and where it falls in the hash intervals for the groups 1-n at 212*a-m*. Thus, as data object 1 has its hash value calculated at 210*a*, it may be sorted into its respective group at 212*a* while data object 2 may still have its hash value calculated.

For example, the data objects may be sorted in steps 212*a-m* by a query such as:
SELECT ALL data_object_ID IN data_objects_partition WHERE hash_md5(data_object_ID) BETWEEN min_hash (j) AND max_hash(j);

Alternatively, another implementation query may be written as:
SELECT ALL data_object_ID WHERE criteria1 BETWEEN value1 AND value2 AND criteria2=value3 AND hash_md5(data_object_ID) BETWEEN min_hash(j) AND max_hash(j);

Once all the data objects have had hash values calculated and then been sorted into their respective groups based on their calculated hash values, the parallelized process completes at 213. Once the data objects are all in groups, the groups may be provided to another application, system, or process for further use. For example, the data objects in the groups may be processed by the same application that formed the groups, or may be processed by another application or system that requested the data groupings. The data object processing may depend upon the application using the groups. For example, a database system may update each of the records in the groups, whereas a booking system may perform each of the requested bookings in the groups, or an accounting system may perform accounting calculations for each of the records in the groups.

In one embodiment, an object may be processed upon being assigned to its group at 212*a-m*, within the parallel process 209 rather than proceeding to close the parallel process at 213. Such an embodiment may improve runtime performance, such as processing time or resource usage.

As a simple example scenario, twenty data objects may be provided for distribution into four groups. Hash values may be calculated for each group over a range from "000" to "100." The resulting group hash values may be "025," "048," "076," and "099." Thus, group 1's hash interval may be "000" to "025," group 2's hash interval may be "026" to "048," group 3's hash interval may be "049" to "076," and group 4's hash interval may be "077" to "099." Each of the twenty data objects may then have a hash value calculated, which may be used to determine which group the data object should be sorted into. The first data object may have a hash value of "090," and thus the first data object may be placed in group 4. The second data object may have a hash value of "012," putting it in group 1. This may continue for the remainder of the twenty data objects, until all data objects are distributed into groups 1-4.

In this way, the data objects may be sorted into groups based on calculated hash values, independent of their attributes, criteria, or other aspect of their data model. Generally, the data objects may be distributed approximately evenly into the groups due to the uniformity property of most hash functions, which evenly distributes the hash values as they are generated. The evenness of the distribution may depend on the hash function used, but for most hash function models, the distribution may result in groups that do not have a high variance in size, statistically.

In a specific example, the disclosed grouping can be used in conjunction with a parallel processing framework, such as the FRAMEWORK FOR PARALLEL PROCESSING of SAP, SE, of Walldorf, Germany. The framework can facilitate users incorporating parallel processing into various analysis, including automating certain steps, such as batching records into jobs to be performed in parallel. The disclosed technique can improve such a framework by better defining the groups for processing, resulting in a more even distribution of computing jobs.

Example 6—Using Data Object Distribution

Figure 3A:
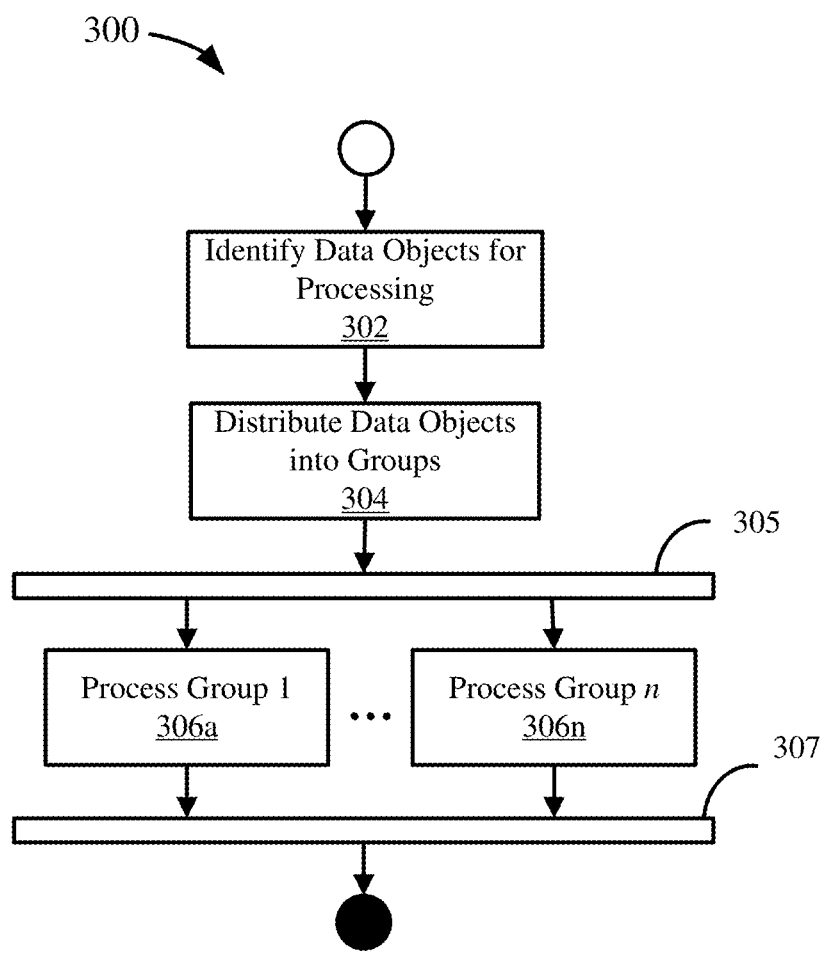
FIG. 3A is a flowchart illustrating a process for processing groups of distributed data objects.

FIG. 3A is a flowchart illustrating a process 300 for processing groups of distributed data objects in parallel. The data objects for processing are identified at 302. The data objects may be undistributed data objects as shown in FIGS. 1A-B or a set of data objects as shown in FIGS. 1B-C. For example, the data objects may be records in a database that require updating or analysis that can be performed more efficiently by processing the records in parallel.

The data objects are distributed into groups at 304. Generally, this is the process of data object distribution as shown in FIG. 2. Using the data grouping process as described herein and shown in FIG. 2 may generally result in data objects being evenly distributed across the groups.

Once the objects are distributed into groups at 304, at least a portion of the groups may be processed in parallel at 305. That is, some of the groups can be processed serially, such as if computing resources are not sufficient to concurrently process all of the groups, or all of the groups may be processed in parallel if desired or allowed. Each data object in group 1 may be processed at 306a, while each object in group n may be processed in parallel at 306n. The group processing 306a-n may process the individual data objects in series or, in some cases (e.g., where the object processing may be extensive, such as in terms of time or resource use), in parallel. Because the data objects are distributed more evenly between the groups, the groups will process in approximately similar amounts of time, and thus lead to an efficient use of resources for processing the data objects (either by time or by computing resource consumption).

Once the groups 1-n have been processed, the parallelization may end at 307. In this way, the data objects may be efficiently processed in parallel by distributing the data objects evenly amongst a multitude of groups which can then be processed in parallel. Such a distribution and processing is independent of a data model, interrelationships, or attributes of the data objects, and so may be implemented broadly in existing or new systems.

Figure 3B:
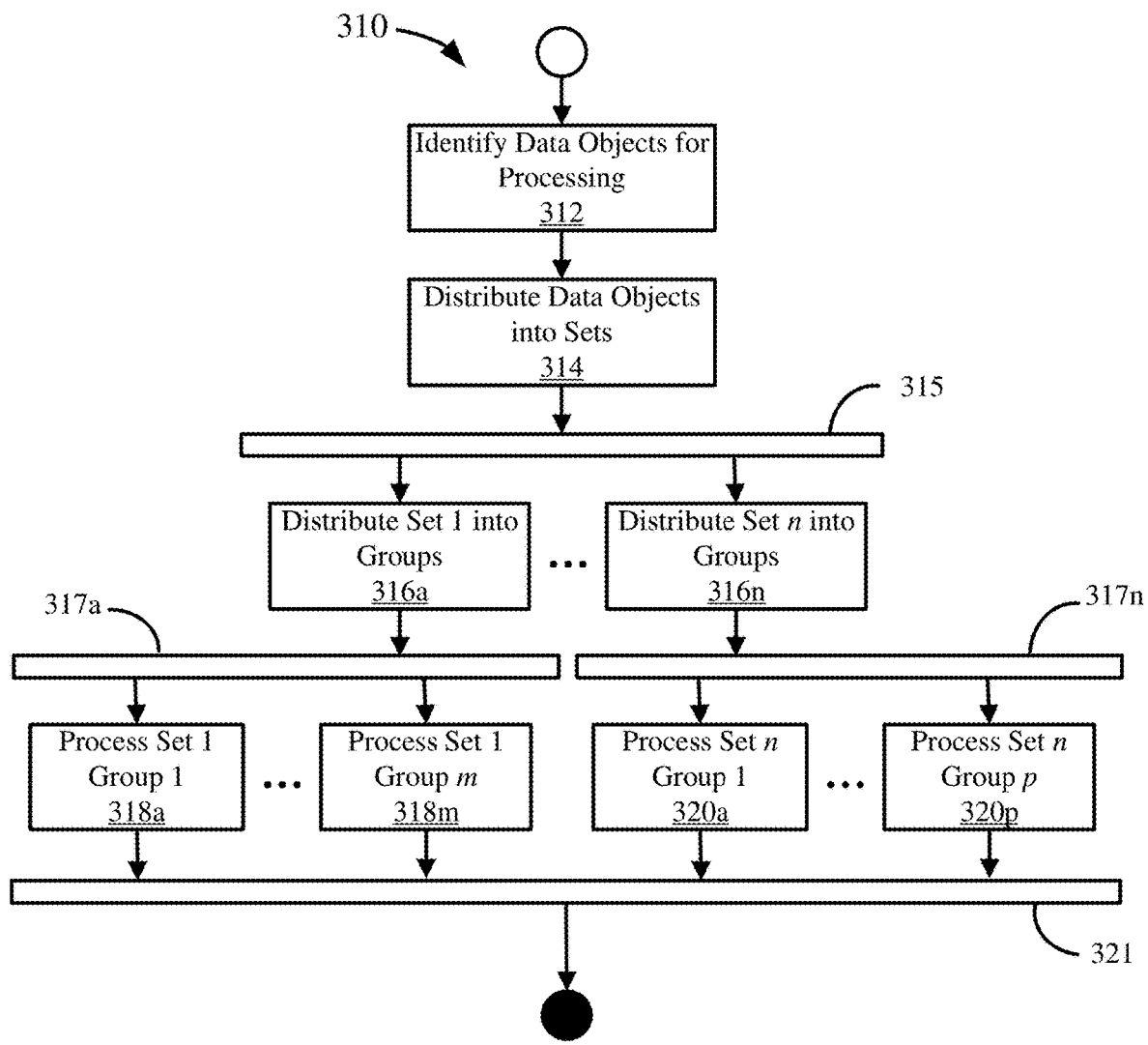
FIG. 3B is a flowchart illustrating a process for processing data objects distributed into multiple levels of groups.

FIG. 3B is a flowchart illustrating a process 310 for processing data objects distributed into multiple levels of groups. The data objects for processing are identified at 312. The data objects may be undistributed data objects as shown in FIGS. 1A-B or a set of data objects as shown in FIGS. 1B-C. For example, the data objects may be records in a database that require updating or analysis that can be performed more efficiently by processing the records in parallel.

The data objects are distributed into sets at 314. This may include distributing the data objects as shown in FIG. 2, or may include dividing the data objects into sets based on analysis of the data objects, criteria or attributes of the data objects, or other factors that may be beneficial for managing the data objects for processing. For example, it may be important to process all records entered on a given day before processing records for the next day, and so on. Thus, the data objects may not be distributed evenly amongst the sets.

The data objects are distributed into groups by sets at 316a-316n in parallel process 315. Generally, this is the process of data object distribution as shown in FIG. 2. Using the data grouping process as described herein and shown in FIG. 2 may generally result in data objects being evenly distributed across the groups. Each set 1-n may have its own independent collection of groups for its data objects.

As the objects are distributed fully into groups at 316a-n, the groups may be processed in parallel at 317a-n. Each data object in set 1 group 1 may be processed at 318a, while each object in set 1 group m may be processed in parallel at 318m. Separately, each data object in set n group 1 may be processed at 320a, while each object in set n group p may be processed in parallel at 320p. As discussed above, in some cases, at least some groups can be processed serially, such as when computing resources are not sufficient for complete parallel processing of all of the groups.

The group processing 318a-m, 320a-p may process the individual data objects in series or, in some cases where the object processing may be extensive (e.g., time or resource intensive), at least a portion of the object processing may be carried out in parallel. Because the data objects are distributed evenly for a collection of groups between the groups, such as set 1 groups 1-m or set n groups 1-p, the groups for the same set will process in approximately similar amounts of time, and thus lead to an efficient use of resources for processing the data objects (either by time or by computing resource consumption).

Once the groups 318a-320p (1-m and 1-p) have been processed, the parallelization may end at 321. In this way, the data objects may be efficiently processed in parallel by distributing the data objects evenly amongst a multitude of groups which can then be processed in parallel. Such a distribution and processing is independent of a data model, interrelationships, or attributes of the data objects, and so may be implemented broadly in existing or new systems. Further, the objects may be partially divided by criteria or attributes of the data objects, while later still be evenly distributed into groups.

Figure 3C:
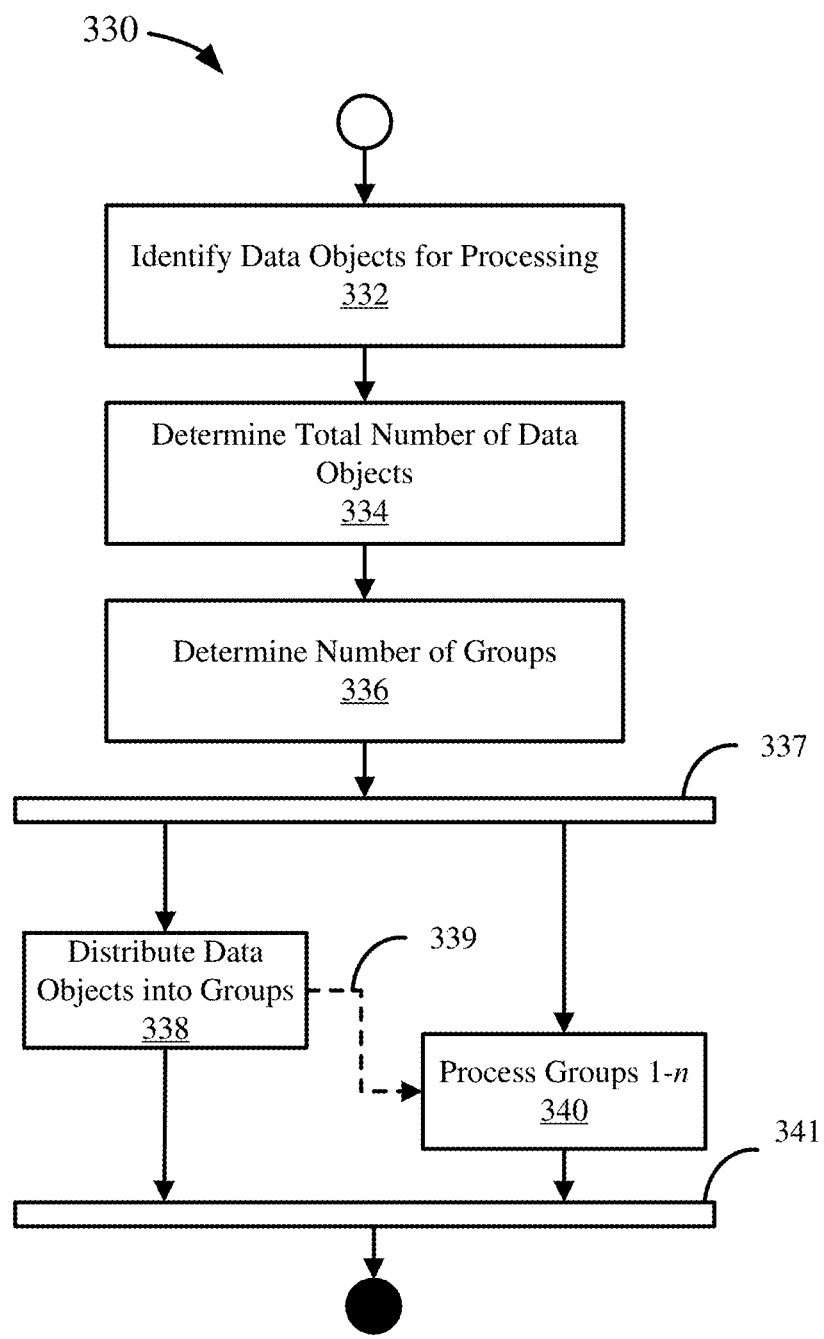
FIG. 3C is a flowchart illustrating a process for distributing and processing data objects within a parallelization.

FIG. 3C is a flowchart illustrating a process 330 for distributing and processing data objects within the same parallelization. FIG. 3C may represent one example combination of FIG. 2 with FIG. 3A or 3B.

The data objects for processing are identified at 332. The data objects may be undistributed data objects as shown in FIGS. 1A-B or a set of data objects as shown in FIGS. 1B-C. For example, the data objects may be records in a database that require updating or analysis that can be performed more efficiently by processing the records in parallel.

The total number of data objects is determined at 334. Generally, this is the total number of data objects that will be distributed into data groups as identified at 332, and may be undistributed data objects, such as in FIGS. 1A-B, or may be a set of one on or more data objects, such as in FIGS. 1B-C.

The number of groups into which the data objects may be distributed is determined at 336. The number of groups may be a semi-static number, such as a constant value, a registry setting, or other variable that is used without calculation at step 336. Alternatively, the number of groups may be calculated based on the total number of data objects, such as when a target number of data objects is desired in each group. In another embodiment, the number of groups may be calculated based on the available computing resources available. For example, the number of groups may correspond to the number of CPUs, computing cores, or remote compute servers or other resources available, the number of threads available, the memory available for each computing resource so as to efficiently store each group of data objects while avoiding paging, or other factor or factors in determining efficient resource usage for processing the groups of data objects. In some cases, a user, or a rule, can specify an amount of computing resources that should be made available for grouping or subsequent parallel processing. Once the number of groups is determined, the process may have, or be considered to have, groups 1-n (the total number of groups).

Further, in some embodiments, processing of the groups may be staged at 336, once the total number of groups is determined. Staging may include defining or instantiating any necessary variables or data structures for containing or otherwise storing the data objects or references to the data objects in the groups.

Parallelization of the process 330 may begin at 337. Within the parallelization 337, the data objects are distributed into groups at 338. Generally, this is the process of data object distribution as shown in FIG. 2. Using the data grouping process as described herein and shown in FIG. 2 may generally result in data objects being evenly distributed across the groups.

As the data objects are distributed into groups at 338, at least a portion of the groups 1-n may be processed in parallel at 340. The groups 1-n may be processed in parallel at 340 with respect to each other, and in parallel with respect to the data object distribution at 338 (which may itself be performed in parallel with respect to the data objects). The group processing at 340 may be similar to that shown in FIG. 3A or 3B.

Generally, the group processing at 340 begins once at least one data object is placed 339 in at least one group. As data objects are placed in a group 339 by the distribution at 338, the data object may be immediately processed, in parallel, at 340. If a data object for the group is already being processed at 341, the received 339 data object may be placed in the group and await processing. The group may be formed as a linked list, a queue, a stack, a tree, or other structure for maintaining data objects or references to data objects, and may further provide an order of the data objects for processing at 340. In this way, data objects may be passed 339 directly from distribution 338 to processing at 340 within a parallelized process 337.

Once the data objects have been distributed 338 and the groups 1-n have been processed at 340, the parallelization may end at 341. In this way, the data objects may be efficiently processed in parallel by distributing the data objects evenly amongst a multitude of groups which can then be processed in parallel. Such a distribution and processing is independent of a data model, interrelationships, or attributes of the data objects, and so may be implemented broadly in existing or new systems.

Example 7—Data Grouping Code

Figure 5:
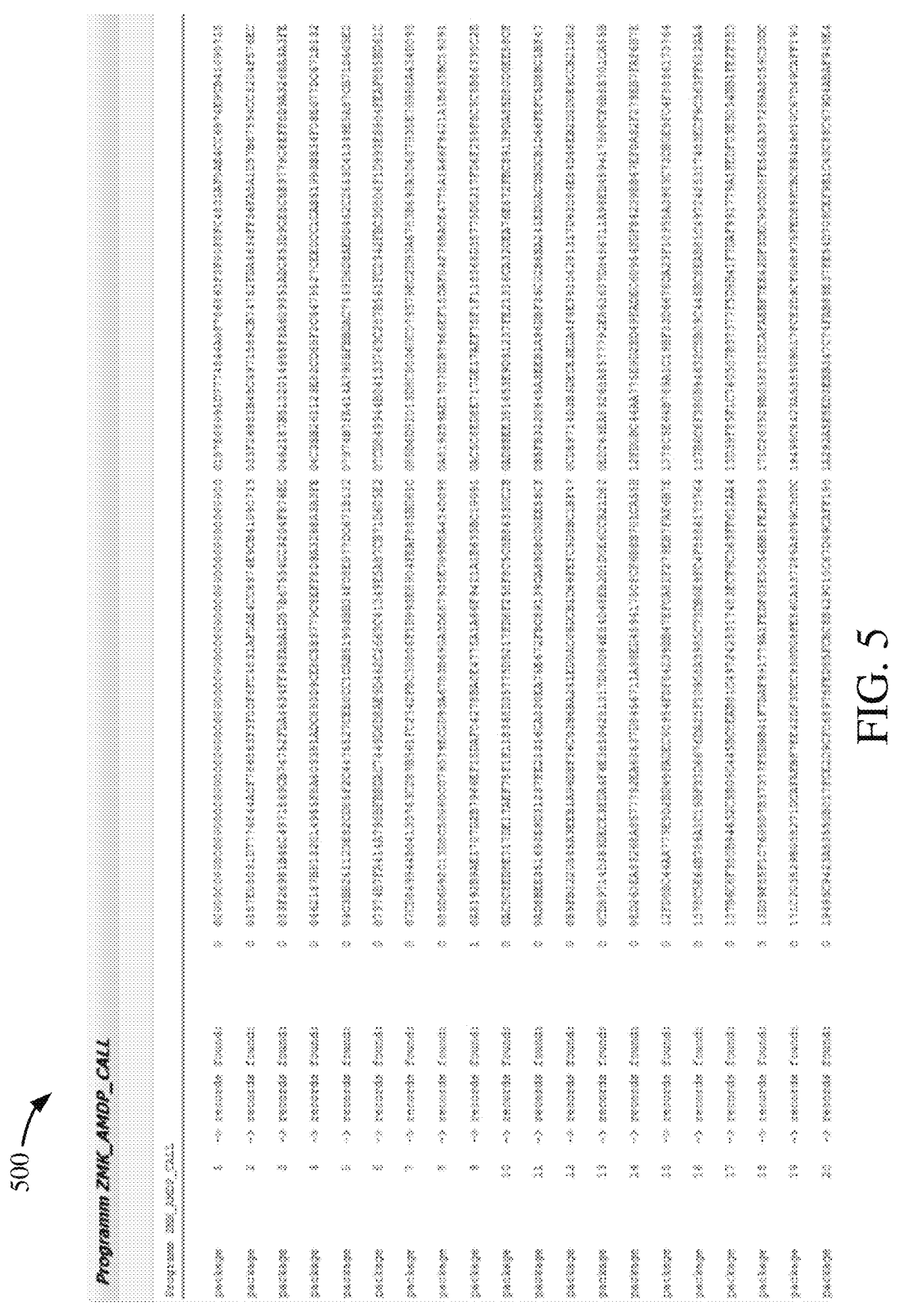

The following ABAP code is an example test implementation of the described method for distributing data objects evenly and independently of the data model for the objects. The code is written as a report, thus enabling the script to display output as it is executed, similar to as shown in FIG. 5.

```
REPORT z_amdp_call.
DATA:
    l_low TYPE string,
    l_high TYPE string.
DATA(lrcl_connection) = cl_sql_connection=>get_connection( ).
DATA(lrcl_statement) = lrcl_connection->create_statement( ).
DO 100 TIMES. " number of packages to be processed
    " part 1: get interval boundaries
    TRY.
        /ba1/cl_per_fc_pcd_amdp=>get_pkey_interval(
            EXPORTING
                i_packages_total                = 100
                i_packages_current              = sy-index
            IMPORTING
                e_pkey_low                      = l_low
                e_pkey_high                     = l_high ).
    CATCH /ba1/cx_al_fc_pcd_exception INTO DATA(lcx).
        ASSERT 1 = 2. "unexpected error; terminate the process
    ENDTRY.
    IF l_high IS INITIAL.
        "...
    ENDIF.
    "part 2: get data objects for interval ------------------------
    CONDENSE l_low NO-GAPS.
    CONDENSE l_high NO-GAPS.
    TYPES: BEGIN OF ty_result,
              /ba1/c35btran TYPE char35, "identifier of a data object
           END OF ty_result.
    DATA:
        lt_result TYPE STANDARD TABLE OF ty_result,
        lrclat_res TYPE REF TO data,
        lv_query TYPE string.
    TRY.
        CLEAR lt_result.
        " trick: build hash_sha256 based on arbitrary variables for package building
        lv_query = | select distinct "/BA1/C35BTRAN" | &&
                   | from "/1BA/HM_WT86_100" | &&
                   | where hash_sha256( to_binary("/BA1/C35BTRAN"), to_binary("/BA1/C35BTSRC"), to_binary("/BA1/C35POSNR") ) | &&
                   | between '{ l_low }' and '{ l_high }' |.
        DATA(lrcl_result) = lrcl_statement->execute_query( lv_query ).
        GET REFERENCE OF lt_result INTO lrclat_res.
        lrcl_result->set_param_table( lrdat_res ).
```

```
        lrcl_result->next_package( ).
        lrcl_result->close( ).
        WRITE: /, 'package', sy-index, ' ->records found: ', lines( lt_result ), l_low, l_high.
    CATCH cx_root INTO DATA(lcx1).
        ASSERT 1 = 2. "unexpected error; terminate the process
ENDTRY.
ENDDO.
```

The following is further example test code for applicable method classes written in ABAP via SQLScript.

```
/ba1/cl_per_fc_pcd_amdp=>get_pkey_interval
method get_pkey_interval by DATABASE PROCEDURE FOR HDB LANGUAGE SQLSCRIPT.
    declare i integer;
    DECLARE l_temp_tab TABLE ( hash_string varchar(100), ccc integer );
    DECLARE l_temp_tab_new TABLE ( hash_string varchar(100), ccc integer );
    declare hashdummy varchar( 100) array;
    declare idummy integer array;
    FOR i IN 1 ..:l_packages_total DO
        hashdummy[:i] = i;
        idummy[:i] = i;
    END FOR;
    l_temp_tab_new = unnest(:hashdummy, idummy) as ("HASH_STRING","CCC");
        l_temp_tab =
        SELECT hash_sha256( to_binary("HASH_STRING"), to_binary('HelloWorldIsSomeSalt'
) )
            --
SELECT hash_md5( to_binary("HASH_STRING"), to_binary('HelloWorldIsSomeSalt') )
            as hash_string, '1' as ccc
            FROM :l_temp_tab_new;
            l_temp_tab_new = select * from :l_temp_tab order by hash_string asc;
            FOR i IN 1 ..:Lpackages_total DO
                l_temp_tab_new.ccc[:i] = i;
            END FOR ;
        IF :l_packages_current < l_packages_total then
                l_temp_tab = select top 1 * from :l_temp_tab_new where ccc = :l_packages_current;
                e_pkey_high =:l_temp_tab.hash_string[1];
            else
                e_pkey_high ='FFFFFFFFFFFFFFFFFFFFFFFFFFFFFFFFFFFFFFFFFFFFFFFFFFFFFFFFFFFFFFFF';
        end if;
        IF :l_packages_current > 1 then
            l_temp_tab = select top 1 * from :l_temp_tab_new where ccc = ( :l_packages_current - 1 );
            e_pkey_low = :l_temp_tab.hash_string[1];
        else
            e_pkey_low = '0000000000000000000000000000000000000000000000000000000000000000';
        end if;
ENDMETHOD.
```

Example 8—Environments for Data Object Distribution

Figure 4A:
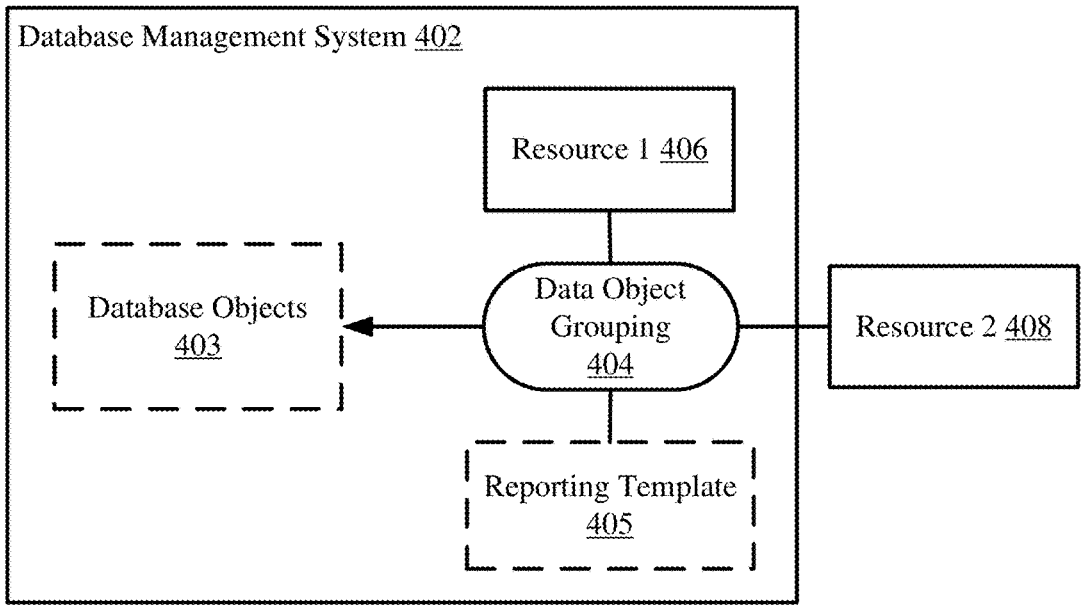
FIG. 4A is an architecture depicting a data object grouping process in a database.

FIG. 4A is an architecture 400 depicting a data object grouping process in a database. A database management system 402 may have a set of database objects 403 which form the database. The database objects 403 may be records, tables, views, procedures, synonyms, sequences, triggers, or other database objects.

The database management system 402 may have a data object grouping procedure 404, as described herein. Such a data grouping procedure 404 may group the database objects 403 independently of the data model for the database, and into approximately evenly-sized groups. The data grouping procedure 404 may be executed as part of other database processes, or be accessible to other systems outside the database management system 402, such as via an API or remote function or procedure call. The data grouping procedure 404 may also provide reports or other information concerning the data grouping and status of the groups it generates.

The data grouping procedure 404 may have one or more reporting templates, such as Reporting Template 405, for providing the results of the data grouping (e.g. generating reports). A reporting template 405 may include error messages for the data grouping procedure 404 or for individual data objects or groups within the data grouping process, or may include summary data for the data grouping procedure or individual data objects or groups within the procedure. A reporting template 405 may provide such reporting information through a user interface (e.g., display) or may output the reporting information in a log file.

The data grouping procedure 404 may have access to multiple additional resources for performing the data grouping, such as Resource 1 406 or Resource 2 408. Such resources may be available within the database management system 402, such as resource 1 406, or may be outside the database management system, such as resource 2 408. The resources may be remote computing resources, or may be threads or CPUs available for processing.

Figure 4B:
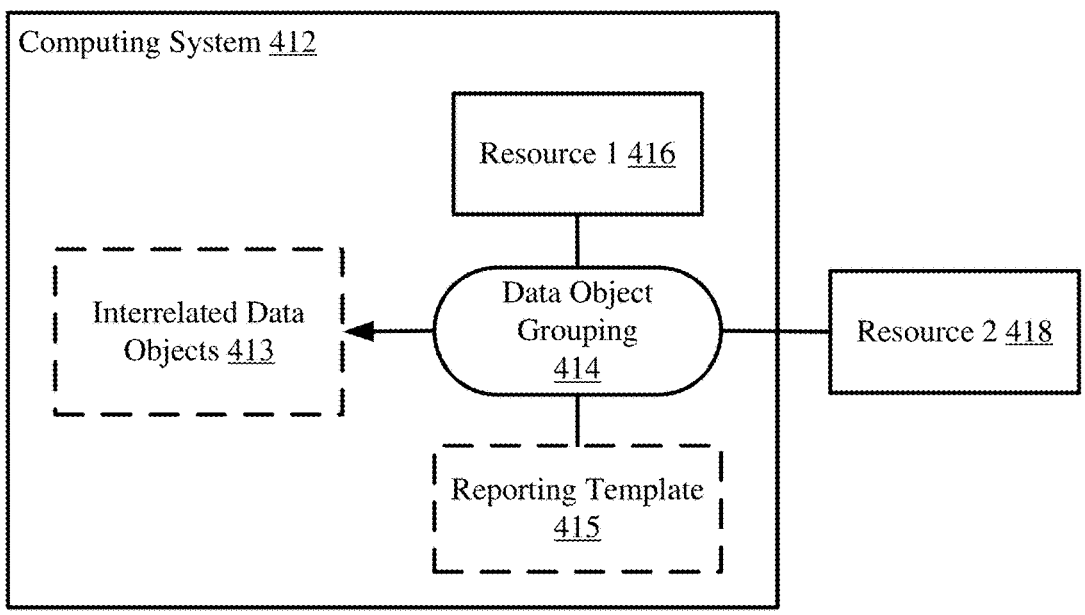
FIG. 4B is an architecture depicting a data object grouping process in a computing system.

FIG. 4B is an architecture 410 depicting a data object grouping process in a computing system. A computing system 412 may have a set of interrelated data objects 413. The interrelated data objects 413 may be records, instantiated class objects, leaf-node trees, such as B or B+ trees, linked instantiated variables, or other data variables.

The computing system 412 may have a data grouping procedure 414, as described herein. Such a data grouping procedure 414 may group the interrelated data objects 413 independently of the interrelationships of the data objects, and into approximately evenly sized groups. The data grouping procedure 414 may group the interrelated data objects 413 for processing by groups in parallel, such processing as recompiling, validating, updating, restructuring, or otherwise using the data objects. The data grouping procedure 414 may be executed as part of other computing system processes, or be accessible for execution by other processes in the computing system 412. The data grouping procedure 414 may also provide reports or other information concerning the data grouping or status of the interrelated data objects 413 or groups.

The data grouping procedure 414 may have one or more reporting templates, such as Reporting Template 415, for providing the results of the data grouping (e.g., generating reports). A reporting template 415 may include error messages for the data grouping procedure 414 or for individual data objects or groups within the data grouping process, or may include summary data for the data grouping procedure or individual data objects or groups within the procedure. A reporting template 415 may provide such reporting information through a user interface (e.g., display) or may output the reporting information in a log file. In some aspects, an error message can be generated when an invalid object is detected, or when an attempt is made to access an invalidated object.

The data grouping procedure 414 may have access to multiple additional resources for performing the data grouping, such as Resource 1 416 or Resource 2 418. Such resources may be available within the computing system 412, such as resource 1 416, or may be outside the computing system, such as resource 2 418. The resources may be remote computing resources, or may be threads or CPUs available for processing.

Example 9—Data Groupings Report

FIG. 5 is an example summary report 500 for evenly distributed data object groups. The report 500 may list the data groups, or packages, created, the number or other identifier for the data group, the number of records placed in the group, and the hash interval for the data group. In some embodiments, the report may be displayed as the data objects are distributed into the groups, and thus may be updated as data objects are added to the groups. Such a report 500 may be used in conjunction with sample code implementations, or test implementations, as disclosed herein.

Example 10—Further Data Distribution Processes

Figure 6A:
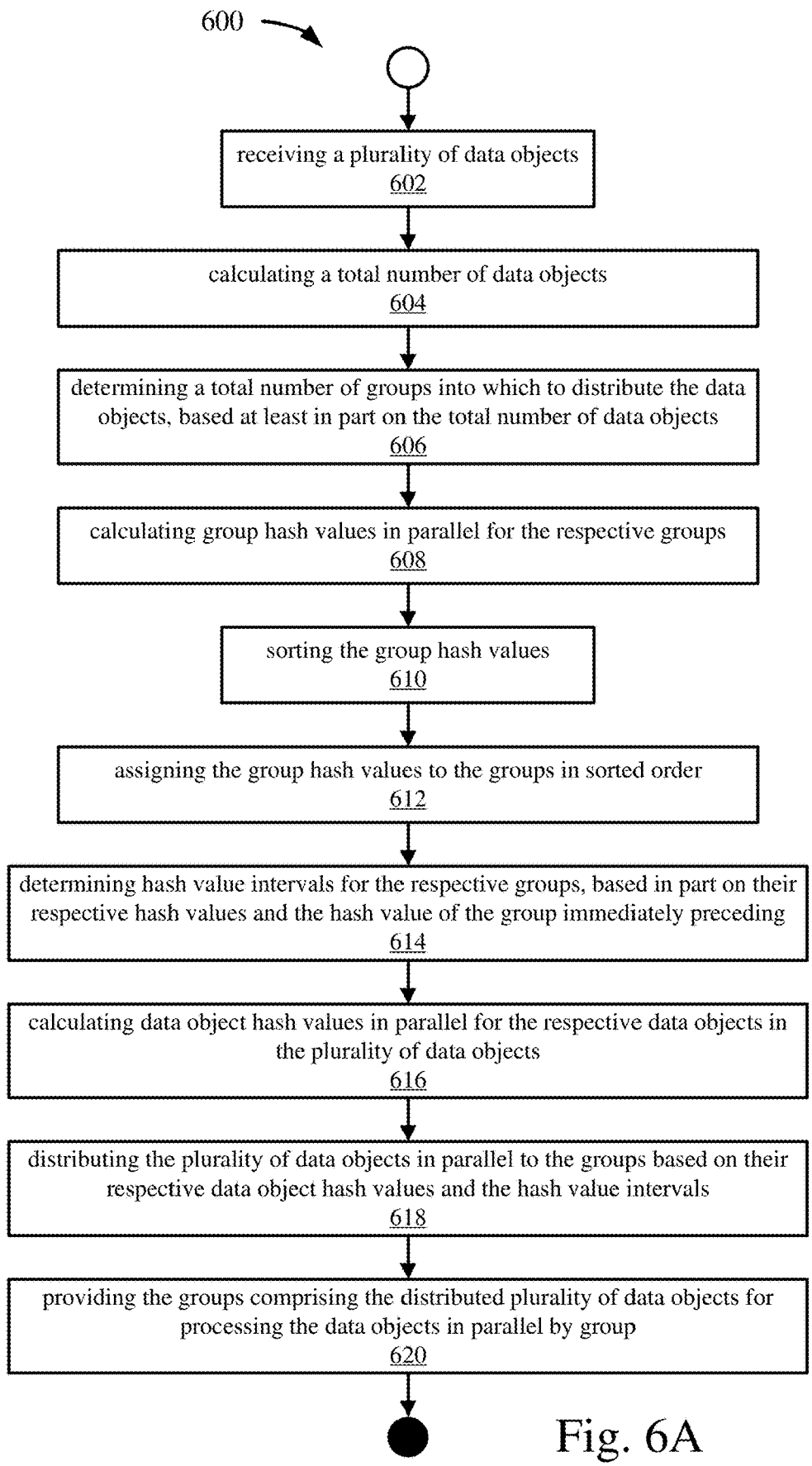
FIG. 6A is a flowchart illustrating a process for improved data distribution for parallel processing.

FIG. 6A is a flowchart illustrating a process 600 for improved data distribution for parallel processing. A plurality of data objects may be received at 602. A total number of data objects (in the plurality of data objects) may be calculated at 604. A total number of groups into which to distribute the data objects, based at least in part on the total number of data objects, may be determined at 606.

Group hash values may be calculated in parallel for the respective groups at 608. The group hash values may be sorted at 610. The group hash values may be assigned to the groups in sorted order at 612. Hash value intervals for the respective groups may be determined at 614, based in part on their respective hash values and the hash value of the group immediately preceding.

Data object hash values may be calculated in parallel for the respective data objects in the plurality of data objects at 616. The plurality of data objects may be distributed in parallel to the groups based on their respective data object hash values and the hash value intervals at 618. The groups comprising the distributed plurality of data objects for processing the data objects in parallel by group may be provided at 620.

In some aspects, data to be processed can be stored according to a first grouping or arrangement, such as a partition of data according to one or more criteria (e.g., a primary key). When such data is processed according to the process 600, the distribution criteria is a distribution criteria other than that providing the first grouping or arrangement. In at least some implementations, the distribution of data objects in the process 600 is carried out at runtime, or on the fly. That is, the data objects can remain stored according to the first grouping or arrangement.

Figure 6B:
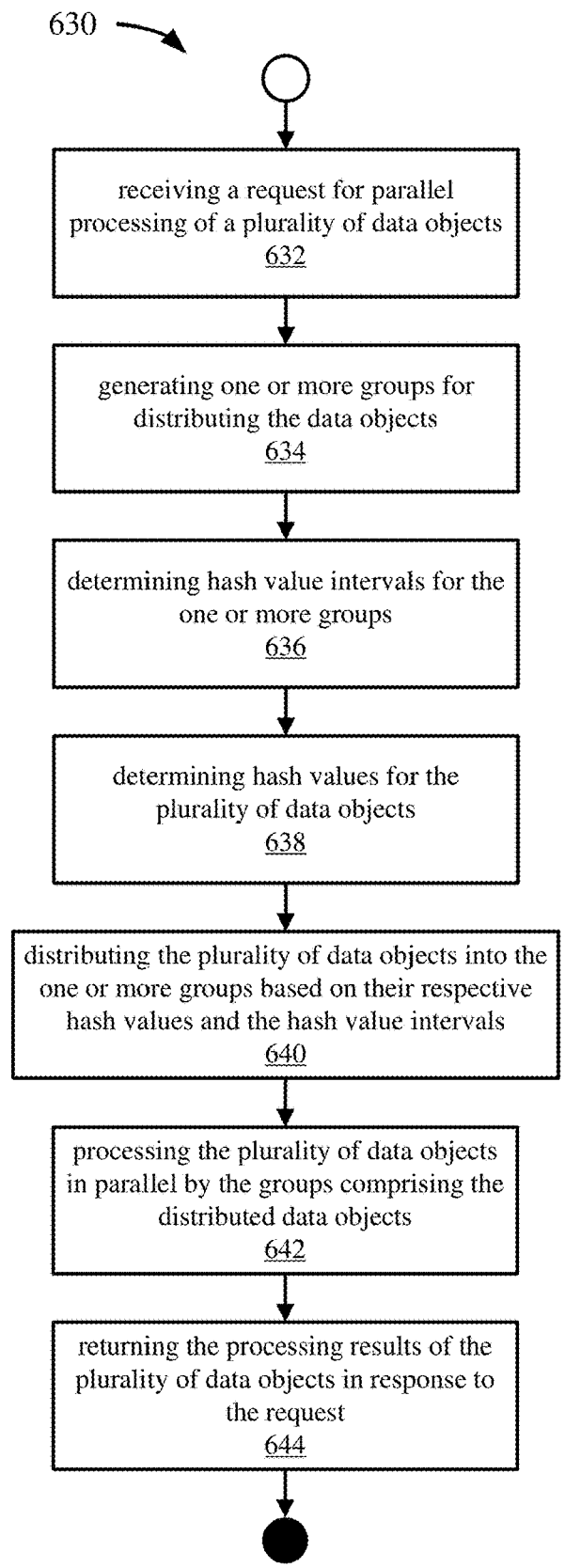
FIG. 6B is a flowchart illustrating an improved process for distributing data objects.

FIG. 6B is a flowchart illustrating an improved process 630 for distributing data objects. A request for parallel processing of a plurality of data objects may be received at 632. One or more groups for distributing the data objects may be generated at 634. Hash value intervals for the one or more groups may be determined at 636. Hash values for the plurality of data objects may be determined at 638. The plurality of data objects may be distributed into the one or more groups based on their respective hash values and the hash value intervals at 640. The plurality of data objects may be processed in parallel by the groups comprising the distributed data objects at 642. The processing results of the plurality of data objects may be provided in response to the request at 644.

Figure 6C:
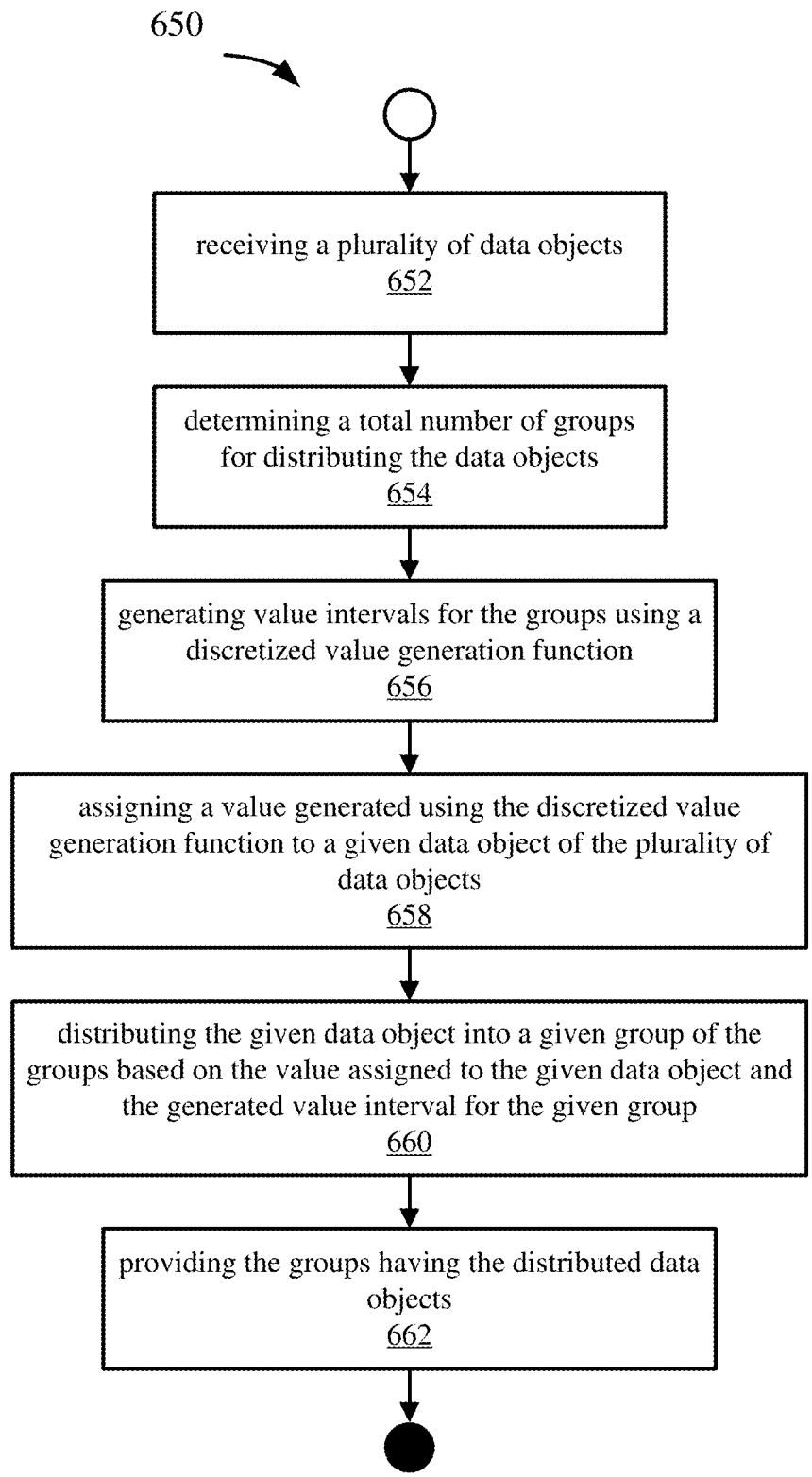
FIG. 6C is a flowchart illustrating a process for reducing skew in groups of data objects to be processed in parallel.

FIG. 6C is a flowchart illustrating a process 650 for reducing skew in groups of data objects to be processed in parallel. A plurality of data objects may be received at 652. A total number of groups for distributing the data objects may be determined at 654. Value intervals for the groups may be generated using a discretized value generation function at 656. A value generated using the discretized value generation function may be assigned to a given data object of the plurality of data objects at 658. The given data object may be distributed into a given group of the groups based on the value assigned to the given data object and the generated value interval for the given group at 660. The groups having the distributed data objects may be provided at 662.

Example 11—Computing Systems

Figure 7:
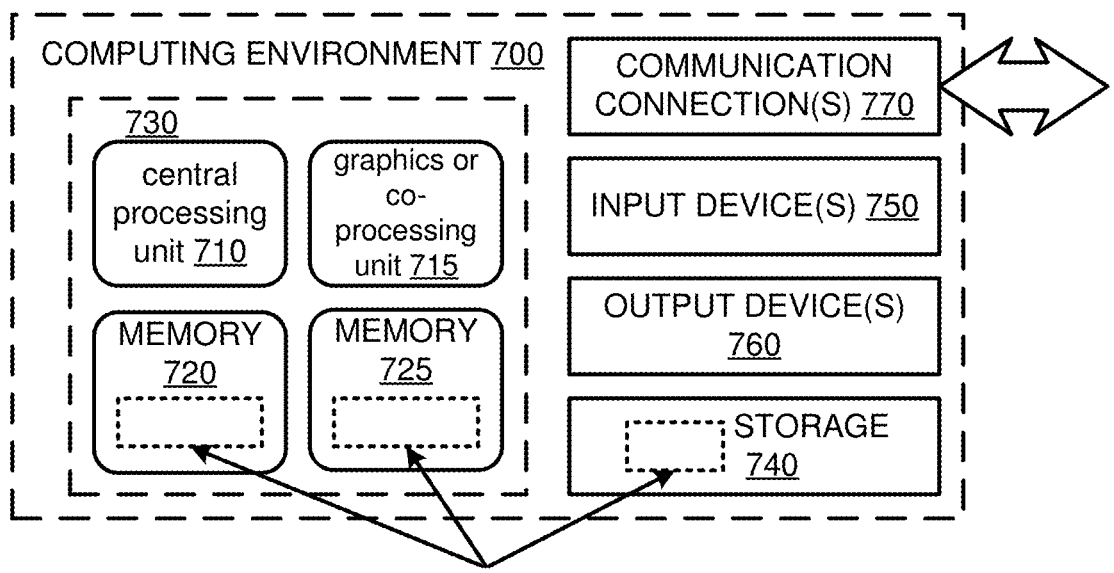
FIG. 7 is a diagram of an example computing system in which described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the processes of FIGS. 2, 3A-B, and 6A-C or the systems of FIG. 1A-C or 4A-B. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store settings or settings characteristics, such as for the data objects in FIGS. 1A-C, systems in FIGS. 4A-B, or the steps of the processes shown in FIG. 2, 3A-B, or 6A-C.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 8:
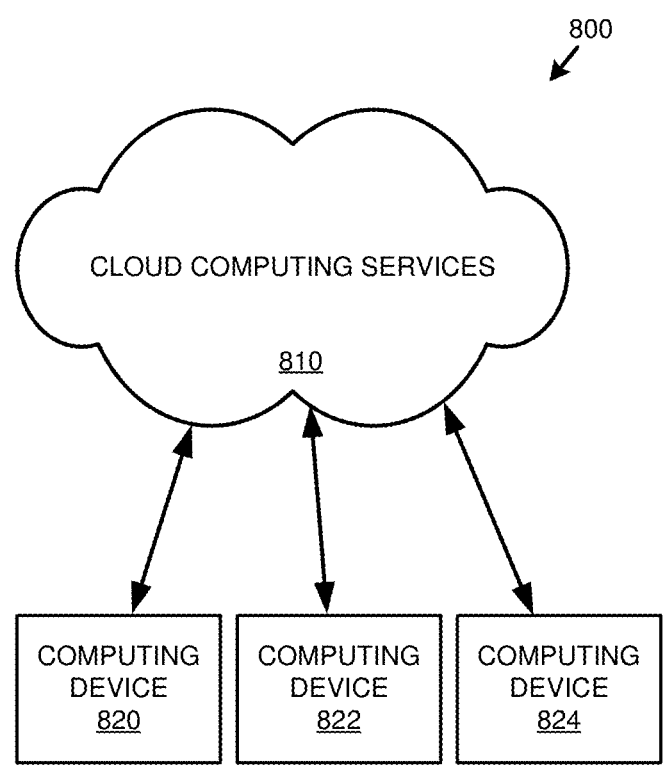
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A system comprising:
one or more memories;
one or more processing units coupled to the one or more memories; and
one or more computer readable storage media storing instructions that, when executed, cause the system to perform operations comprising:
receiving a request for processing a plurality of data objects;
in response to the receiving the request:
receiving the plurality of data objects;
calculating a total number of data objects;
determining a total number of groups into which to distribute the data objects, based at least in part on the total number of data objects, wherein the total number of groups is a plurality of groups;
determining group hash values for the respective groups, wherein a number of group hash values determined is equal to the total number of groups;
sorting the group hash values;
assigning the group hash values to the groups in a sorted order;
determining hash value intervals for the respective groups, based in part on their respective hash values and the hash value of the group immediately preceding;
calculating data object hash values for the respective data objects in the plurality of data objects;
distributing the plurality of data objects to the groups based on their respective data object hash values and the hash value intervals;
providing the groups comprising the distributed plurality of data objects for parallel processing; and
processing multiple groups of the groups in parallel.

2. The system of claim 1, wherein the data objects are records from a database.

3. The system of claim 1, wherein distributing the plurality of data objects comprises storing a reference to a given data object in its given applicable group.

4. The system of claim 1, wherein the total number of groups is calculated based at least in part on available computing resources at a time of the receiving the request.

5. The system of claim 1, wherein the group hash values are calculated from respective groups of the plurality of groups.

6. The system of claim 1, wherein at least a portion of the data objects are partitioned according to a partitioning criteria and the partitioning criteria is not used in calculating the data object hash values.

7. The system of claim 1, wherein the group hash values are calculated independently of the groups.

8. The system of claim 1, wherein a plurality of group hash values are determined prior to the receiving the request.

9. The system of claim 1, wherein the group hash values correspond to hash values of data objects of the plurality of data objects.

10. The system of claim 1, wherein a same hash function is used for the group hash values and the data object hash values but the hash function is applied to a different value for the group hash values than for the data object hash values.

11. The system of claim 1, wherein data associated with the plurality of data objects is partitioned into a plurality of partitions and partitions of the plurality of partitions do not correspond to groups of the plurality of groups.

12. One or more non-transitory computer-readable storage media storing computer-executable instructions for causing a computing system to perform operations comprising:
receiving a request for processing a plurality of data objects;
in response to the receiving the request:
receiving the plurality of data objects;
calculating a total number of data objects;
determining a total number of groups into which to distribute the data objects, based at least in part on the total number of data objects, wherein the total number of groups is a plurality of groups;
determining group hash values for the respective groups, wherein a number of group hash values determined is equal to the total number of groups;
sorting the group hash values;
assigning the group hash values to the groups in a sorted order;
determining hash value intervals for the respective groups, based in part on their respective hash values and the hash value of the group immediately preceding;
calculating data object hash values for the respective data objects in the plurality of data objects;
distributing the plurality of data objects to the groups based on their respective data object hash values and the hash value intervals;
providing the groups comprising the distributed plurality of data objects for parallel processing; and
processing multiple groups of the groups in parallel.

13. The one or more non-transitory computer-readable storage media of claim 12, wherein distributing the plurality of data objects comprises storing a reference to a given data object in its given applicable group.

14. The one or more non-transitory computer-readable storage media of claim 12, wherein a total number of groups is calculated based at least in part on available computing resources at a time of the receiving the request.

15. The one or more non-transitory computer-readable storage media of claim 12, wherein the plurality of data objects is divided into data sets, and distributing the plurality of data objects to the groups is performed separately and in parallel for each data set of the data sets.

16. A method, implemented in a computing system comprising at least one hardware processor and at least one memory coupled to the at least one hardware processor, the method comprising:
receiving a request for processing a plurality of data objects;
in response to the receiving the request:
receiving the plurality of data objects;
calculating a total number of data objects;
determining a total number of groups into which to distribute the data objects, based at least in part on the total number of data objects, wherein the total number of groups is a plurality of groups;
determining group hash values for the respective groups, wherein a number of group hash values determined is equal to the total number of groups;
sorting the group hash values;
assigning the group hash values to the groups in a sorted order;
determining hash value intervals for the respective groups, based in part on their respective hash values and the hash value of the group immediately preceding;
calculating data object hash values for the respective data objects in the plurality of data objects;
distributing the plurality of data objects to the groups based on their respective data object hash values and the hash value intervals;
providing the groups comprising the distributed plurality of data objects for parallel processing; and
processing multiple groups of the groups in parallel.

17. The method of claim 16, wherein the total number of groups is calculated based at least in part on available computing resources at a time of the receiving the request.

18. The method of claim 16, wherein the plurality of data objects is divided into data sets, and distributing the plurality of data objects to the groups is performed separately and in parallel for each data set of the data sets.

19. The method of claim 16, wherein a same hash function is used for the group hash values and the data object hash values but the hash function is applied to a different value for the group hash values than for the data object hash values.

20. The method of claim 16, wherein data associated with the plurality of data objects is partitioned into a plurality of partitions and partitions of the plurality of partitions do not correspond to groups of the plurality of groups.

* * * * *